(12) United States Patent  
Barksdale et al.

(10) Patent No.: US 9,710,831 B2  
(45) Date of Patent: Jul. 18, 2017

(54) CARRIED-FORWARD SERVICE UNITS AND COMMODITIZATION THEREOF

(75) Inventors: Addison A. Barksdale, Norcross, GA (US); Jamie Sims, Atlanta, GA (US); Larry D. Powell, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 800 days.

(21) Appl. No.: 12/268,539

(22) Filed: Nov. 11, 2008

(65) Prior Publication Data

US 2009/0061817 A1    Mar. 5, 2009

Related U.S. Application Data

(63) Continuation of application No. 09/749,993, filed on Dec. 28, 2000, now Pat. No. 7,457,777.

(60) Provisional application No. 60/248,025, filed on Nov. 13, 2000.

(51) Int. Cl.
*G06Q 30/00* (2012.01)
*G06Q 40/00* (2012.01)
*G06Q 30/04* (2012.01)
*G06Q 40/04* (2012.01)

(52) U.S. Cl.
CPC ............ *G06Q 30/04* (2013.01); *G06Q 40/04* (2013.01); *G06Q 40/12* (2013.12)

(58) Field of Classification Search
CPC ............................... G06Q 30/04; H04M 15/00
USPC ............ 705/34, 39, 17, 35, 40, 30; 455/406, 455/405, 408
See application file for complete search history.

(56) References Cited

U.S. PATENT DOCUMENTS

| | | | | |
|---|---|---|---|---|
| 4,654,793 | A * | 3/1987 | Elrod | 705/1.1 |
| 4,725,719 | A * | 2/1988 | Oncken et al. | 235/487 |
| 4,795,892 | A * | 1/1989 | Gilmore et al. | 235/381 |
| 4,906,828 | A * | 3/1990 | Halpern | 235/379 |
| 5,325,290 | A * | 6/1994 | Cauffman et al. | 705/34 |
| 5,696,906 | A * | 12/1997 | Peters et al. | 705/34 |
| 5,884,284 | A * | 3/1999 | Peters et al. | 705/30 |
| 6,044,360 | A * | 3/2000 | Picciallo | 705/21 |
| 6,424,706 | B1 * | 7/2002 | Katz et al. | 379/144.01 |
| 6,487,542 | B2 * | 11/2002 | Ebata et al. | 705/69 |
| 6,532,282 | B1 * | 3/2003 | Plush et al. | 379/114.03 |
| 6,615,034 | B1 * | 9/2003 | Alloune et al. | 455/406 |
| 6,769,605 | B1 * | 8/2004 | Magness | 235/379 |
| 6,796,497 | B2 * | 9/2004 | Benkert et al. | 235/380 |
| 8,412,151 | B2 * | 4/2013 | Davis et al. | 455/405 |

(Continued)

FOREIGN PATENT DOCUMENTS

WO    WO 9940717 A1 *  8/1999 ............ H04M 17/00

OTHER PUBLICATIONS

Anonymous "Americas: Tarifica Alert " Sep. 13, 1999 Phillips Business Information Sep. 13, 1999.*

(Continued)

*Primary Examiner* — Kelly Campen
(74) *Attorney, Agent, or Firm* — Scott P. Zimmerman, PLLC

(57) ABSTRACT

Methods, systems, and products roll over unused credits. An available number of service units is provided during a billing cycle. The number of service units consumed during the billing cycle is compared to the available number of service units. When service units remain at an end of the billing cycle, then unused service units are rolled over to another billing cycle.

13 Claims, 3 Drawing Sheets

(56) References Cited

U.S. PATENT DOCUMENTS

2001/0034703 A1* 10/2001 Picciallo et al. ............... 705/39
2004/0093303 A1*  5/2004 Picciallo ........................ 705/39

OTHER PUBLICATIONS

Anonymous "Regulatory News Service " Oct. 23, 2000 Bellsouth Corp.—Trading Statement.*
Silberg, Judy, "Cellphone firms aim for retail." Jan. 22, 1996 HFN The Weekly Newspaper for the Home Furnishing Network , v70 , n4 ,p. 103(1).*
Racher et al. "The loan arranger. (food supermarkets launch card schemes to gain customer loyalty) (includes related article on Mondex)(Cover Story)" Jun. 14, 1996 Super Marketing , n1227 , p. 18(3).*

* cited by examiner

CARRIED-FORWARD SERVICE UNITS AND COMMODITIZATION THEREOF

CROSS-REFERENCE TO RELATED APPLICATIONS

This application is a continuation of U.S. application Ser. No. 09/749,993, filed Dec. 28, 2000, now issued as U.S. Pat. No. 7,457,777, and incorporated herein by reference in its entirety. This application also claims the benefit of U.S. Provisional Application 60/248,025, filed Nov. 13, 2000 and entitled "Carried-Forward Service Units and Commoditization Thereof," hereby incorporated by reference.

FIELD OF THE INVENTION

The present invention relates to a system wherein, in connection with a billed service package that provides a service and a number of service units to be employed for the service, unused service units that remain at the end of a service period are carried forward to the next service period. More particularly, the present invention relates to such a system wherein, in connection with a cellular telephone service package that provides cellular telephone service or the like and a number of minutes or the like to be employed for the service, unused minutes or the like left over at the end of a billing cycle are carried forward to the next billing cycle. Thus, such unused minutes do not expire at the end of a billing cycle and can be treated as a commodity.

BACKGROUND OF THE INVENTION

In one form of service as provided by a service provider, a user selects a service package from among a plurality of service packages, where the service package implements a service and defines a number of service units that may be employed in connection with the service. Typically, the service package is provided for a pre-defined period of time, such as for example monthly or quarterly, where the period of time may be characterized as a billing cycle. As is to be appreciated, the service provider bills the user for the service package on a periodic basis that may correspond to the billing cycle, such as for example at the end thereof, ten days after the end thereof, etc.

Also typically, unused service units that remain at the end of a billing cycle expire. That is, even though the user has at least indirectly paid for such unused service units, the units cease to exist.

In one particular example of the above scenario, and as should be appreciated, in cellular telephone service and the like as provided by a cellular telephone service provider, a user typically selects a cellular telephone service package from among a plurality of such service packages. The package may for example provide local service, regional service, national service, international service, or the like, and more importantly may include a pre-determined number of minutes that the user has available for use in connection with such service. Thus, one package may provide 150 minutes of local service for 25 dollars, while another may provide 100 minutes of regional service for 25 dollars, while yet another package may provide 60 minutes of national service for 25 dollars, all on a monthly basis.

Typically, the user initially agrees to obtain and pay for the cellular telephone service and the service package over several billing cycles, i.e., for a year or two, after which the user may continue with the service and service package indefinitely. Importantly, in the prior art, over the many billing cycles that the user has agreed to, unused minutes that remain at the end of each billing cycle expire. That is, even though the user has at least indirectly paid for such minutes, the units cease to exist.

Based on the expiration of minutes at the end of each billing cycle, at least two items of interest occur. One is that the user becomes annoyed with the cellular telephone service provider for the perceived loss of the minutes. Two is that the user is provided with no incentive to continue the service and service package after the initial agreement has been satisfied, and because of item one and perhaps other reasons may be in a frame of mind to shop for service and a service package from another cellular telephone service provider.

More particularly, and with regard to item one, a user over a period of time may grow to regard the provided package minutes as his/her property, and thus becomes agitated when the unused portion of his/her perceived property is unceremoniously deemed non-existent at the end of a billing cycle. While good arguments can be made that such provided package minutes both are or are not in fact the property of the user, the point that is to be appreciated is that the user is dissatisfied.

With regard to item two, once the initial agreement has been satisfied and the user is no longer obligated by such agreement to continue the service and service package, the user by nature may explore options for alternative services and service packages, especially those from other cellular telephone service providers, and especially if the user feels dissatisfied with the current service and/or service package. Of course, it would be better for the current provider to keep the user as a customer, since such user as a customer provides a continued revenue stream, and at any rate it is axiomatic that it is less expensive to keep a current customer than to find a new customer.

Incentives can be and are currently provided to a user to continue as a customer, especially once such user has satisfied his/her initial agreement. For example, the user may be given a customer loyalty credit for purchasing service-related equipment such as a cellular telephone. However, and importantly, the incentive may not always be automatically offered, and therefore the user may not be aware of the incentive. Even if automatically offered, the incentive may be offered too late, i.e., after the user has already decided to switch to an alternative service and service package. At any rate, the user is not 'conditioned' to automatically consider the incentive when deciding whether to switch.

Accordingly, a need exists for a system wherein unused minutes or the like left over at the end of a billing cycle are carried forward to the next billing cycle. As such, the user keeps his/her perceived property, and does not become dissatisfied based on expired minutes. Moreover, at the end of an initial service agreement, the user is automatically conditioned to consider that he/she has un-expired minutes that still exist and that might be lost if the user switches to an alternative service and service package from another cellular telephone service provider or the like. Since such unused minutes do not expire at the end of a billing cycle, the minutes can be treated as a commodity that may be bought, sold, and/or traded for services and/or goods.

SUMMARY OF THE INVENTION

The present invention satisfies the aforementioned need by setting forth a method wherein a service is provided to a customer. The service is measurable in quantifiable service units used by the customer such that billing for the service to the customer is based at least in part on a number of the service units used. The customer is allowed to obtain service unit credits to be applied against service units used by the customer, and the service is billed to the customer according to a billing cycle.

For each billing cycle, service unit credits obtained by the customer and extant are applied against the service units used by the customer during the billing cycle. If service unit credits remain after applying the service unit credits obtained by the customer and extant against the service units used by the customer, such remaining service unit credits are carried forward to be available during a subsequent billing cycle. Importantly, the customer is allowed to treat service unit credits as a commodity, whereby the commoditized service unit credits may be bought, sold, and/or traded for services and/or goods.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
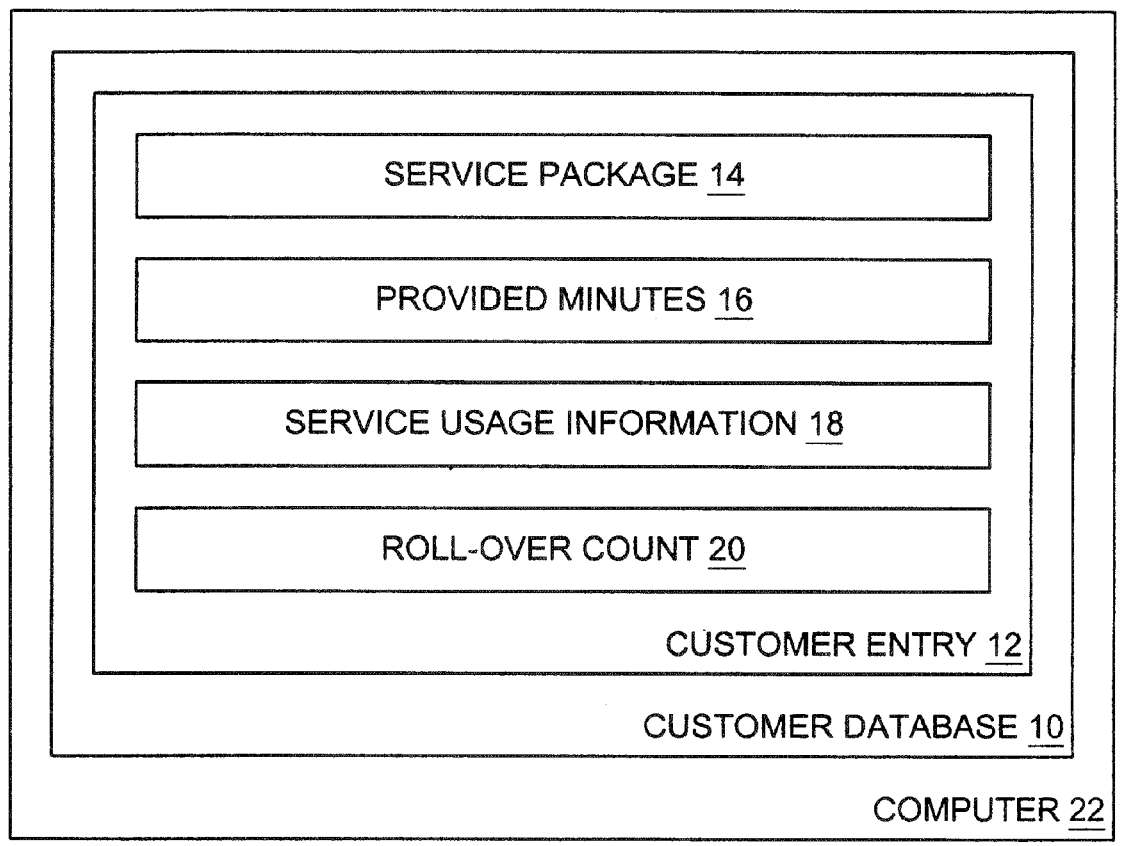
FIG. 1 is a block diagram showing a cellular telephone customer database in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Referring to the drawings in detail, wherein like numerals are used to indicate like elements throughout, there is shown in FIG. 1 a customer database 10 in accordance with one embodiment of the present invention. As may be appreciated, the customer database 10 is operated by or on behalf of a service provider providing a service to each of a plurality of customers, where each customer has a corresponding entry 12 in the customer database 10. As may also be appreciated, the customer database 10 may in fact be a billing system or may be closely aligned with such a billing system. In one embodiment of the present invention, and as will be discussed in more detail below, the service provider is a cellular telephone service provider providing cellular telephone service to each of a plurality of cellular telephone customers.

Nevertheless, it is to be appreciated that the service provider and the service may be any type of service provider and service without departing from the spirit and scope of the present invention. For example, such service provider may be a utility providing gas or electric or cable television or Internet access utility service, a landline telephone service provider providing landline telephone service, a long-distance telephone service provider providing long-distance telephone service, a repair organization providing repair service, etc. Moreover, the service provider and service may encompass a goods provider and goods without departing from the spirit and scope of the present invention.

To continue with the example where the service provider is a cellular telephone service provider, each cellular telephone customer typically selects a cellular telephone service package 14 from among a plurality of such service packages 14. As can be seen, the package 14 chosen is noted in the entry 12 of the database 10 for the customer. The package 14 may for example provide local cellular telephone service (i.e., where the customer 'roams' when outside a local area), regional service, national service, international service, or the like, and more importantly may include a pre-determined number of minute credits ('minutes') 16 that the customer has available for use in connection with such service. As shown, the number of minutes 16 provided is also noted in the entry 12 of the database 10 for the customer, although such number of provided minutes 16 may instead be noted elsewhere.

It is to be appreciated that minutes are but one type of quantifiable service unit that may be employed in connection with the present invention. In general, any other quantifiable unit, such as units of time, value, length, quantity, etc. may be employed without departing from the spirit and scope of the present invention.

In the course of a billing cycle, the customer employs the cellular telephone service by way of an appropriate cellular telephone, and in doing so, service usage information 18 regarding use of the service is stored in the entry 12 of the database 10 for such customer. Being as the cellular telephone service is metered according to minutes of use, it is to be appreciated that the service usage information 18 includes for each incoming and/or outgoing call a datum on a number of minutes for the call.

Thus, at the end of the billing cycle, a total number of minutes for at least some calls may be calculated and compared to the number of provided minutes 16, and billing may then be performed based at least in part on whether the total number of minutes exceeds the number of provided minutes 16. Note that, depending on the selected package 14, at least some calls and the minutes thereof may not count toward the number of provided minutes 16. For example, in most packages 14, emergency calls to help dispatchers do not count, and in some types of package 14, calls between a pre-determined sub-set of customers do not count. Billing for cellular telephone service is generally known or should be apparent to the relevant public and therefore need not be discussed herein in any detail. Accordingly, any particular form of billing may be employed without departing from the spirit and scope of the present invention.

If it is the case that the number of provided minutes 16 for a package 14 selected by a customer is 200 and the total number of minutes used in a billing cycle is 300, the customer is billed based on 100 extra minutes used. Importantly, for the next billing cycle, such customer is provided another 200 minutes for use. In the same case, if the total number of minutes used in a billing cycle is 100, the customer is billed based on not exceeding the 200 provided minutes. Here, though, and relevant to the present invention, the 100 minutes remaining has heretofore been negated. That is, the 100 minutes are taken away from the customer and are no longer available for use by such customer. Accordingly, and again, for the next billing cycle, such customer is provided another 200 minutes for use and has available for use only the 200 newly provided minutes.

In one embodiment of the present invention, then, minutes remaining at the end of one billing cycle are carried forward, added on, or 'rolled over' to the next billing cycle. Thus, the carry-forward or roll-over minutes are added on to any minutes newly provided for the next billing cycle. Thus, and to continue with the above example, if 100 minutes remain at the end of an (n)th billing cycle, the 100 minutes are rolled over to the (n+1)th billing cycle and added on to the 200 newly provided minutes to result in 300 minutes available for use by the customer. In one embodiment, and as seen in FIG. 1, the roll-over count of available minutes is stored in the entry 12 of the database 10 for such customer as a roll-over count 20. As such minutes are used, the roll-over count 20 may be decremented. Alternatively, the roll-over count 20 may only be adjusted at the end of each billing cycle as part of a reconciliation. Such roll-over or accumulated minutes count may also be listed on a bill sent out to the customer. Once again, billing for cellular telephone service is generally known or should be apparent to the relevant public and therefore need not be discussed herein in any detail. Accordingly, any particular form of billing may be employed without departing from the spirit and scope of the present invention.

As may be appreciated upon reflection, allowing for roll-overs of unused minutes provides several benefits. Plainly, the customer does not become annoyed anymore due to a perceived loss of unused minutes. Quite simply, the unused minutes do not expire and are not 'taken away' at the end of each billing cycle, and so the customer is pleased and may in fact feel more 'secure' since the fear of losing minutes is gone. With such security, the customer establishes a heightened sense of trust in the service provider. Note, though, that minutes need not last indefinitely while still being within the spirit and scope of the present invention. For example, minutes may expire five years after acquisition, or upon twelve months of non-use, movement to a service package 14 that does not support roll-over minutes, lack of payment of one or more bills, etc.

In addition, the non-expiring minutes may come to be viewed as a commodity by the customer, where the commodity has perceived value and therefore may be bought, sold, and/or otherwise traded. Importantly, at the end of the term of the initial agreement of the customer, when the user is no longer obligated by such agreement to continue the service and service package, such non-expired minutes and the perceived value thereof provide a strong incentive for the customer to in fact continue the service and service package and not to bother with exploring options for alternative services and service packages from other cellular telephone service providers. This is especially true if the initial agreement specifies that the non-expiring minutes will cease to exist if the customer discontinues the service and/or service package. Thus, the current provider keeps the customer, especially if the customer has built up a relatively large amount of unused minutes and does not want to lose the perceived value thereof.

Figure 2:
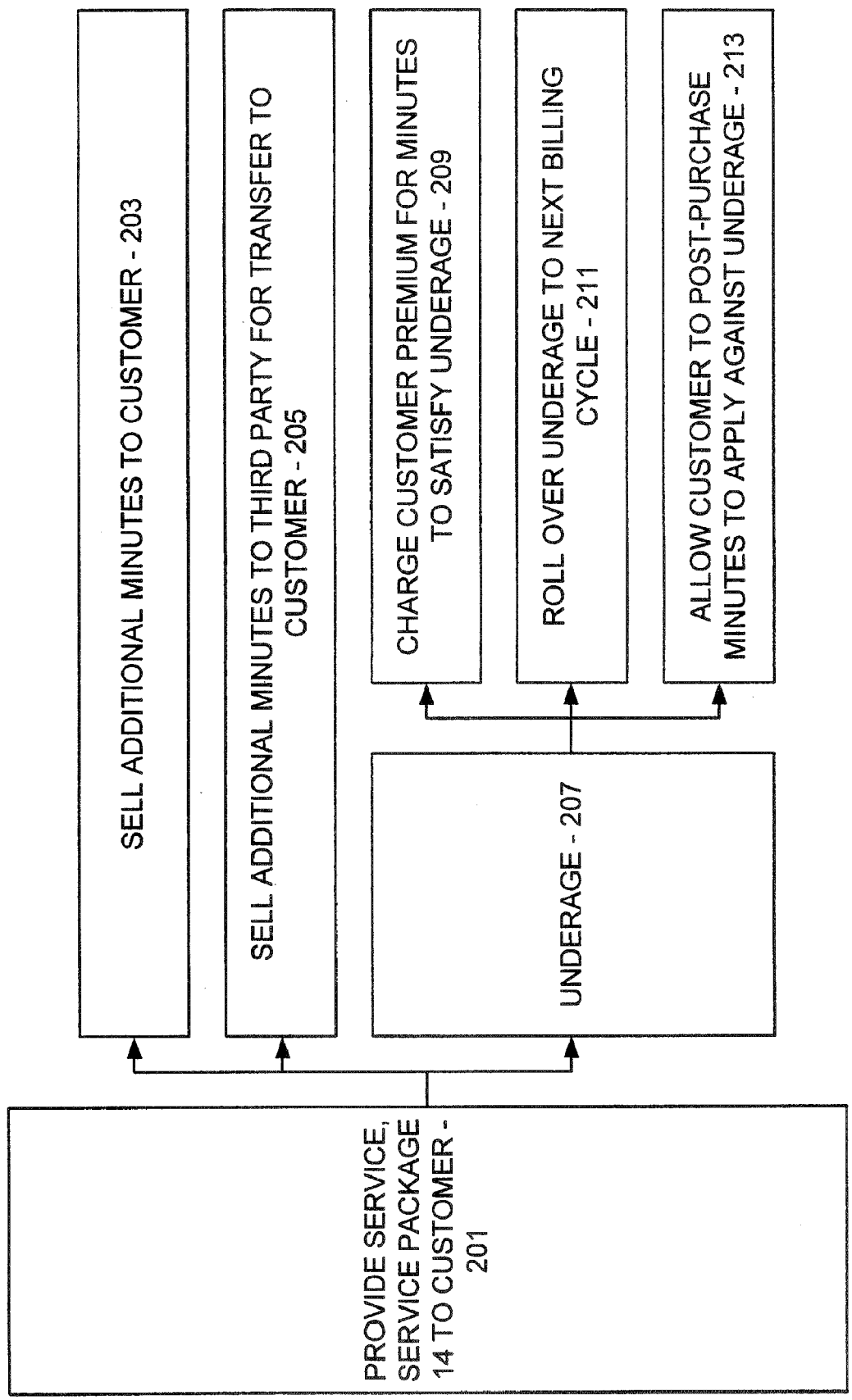
FIG. 2 is a flow chart showing steps performed by a customer obtaining cellular telephone minutes in accordance with one embodiment of the present invention.

Moreover, once the customer comes to perceive the unused non-expiring minutes as a commodity having value, a plethora of opportunities arise that allow the customer and the service provider to benefit. Of course, and referring now to FIG. 2, the prerequisite for taking advantage of such opportunities is that the customer must be provided with service and an appropriate service package 14 by the service provider (step 201). Examples of such opportunities are set forth below.

The service provider may now sell additional minutes to the customer at any time (step 203). For example, the minutes may be sold to the customer if the customer perceives that the minutes will be needed in the coming month, or may be sold to the customer if the customer perceives the amount of unused minutes is becoming low. Further, the customer may be incentivized to pre-purchase additional minutes rather than be charged additional minutes (minutes charged to the customer after the customer has used all provided minutes) if the pre-purchased minutes are less expensive than the charged minutes. Notably, in selling the minutes to the customer, the service provider may also realize a profit by charging a premium for the pre-purchased minutes as compared with the cost to the service provider thereof.

Figure 3:
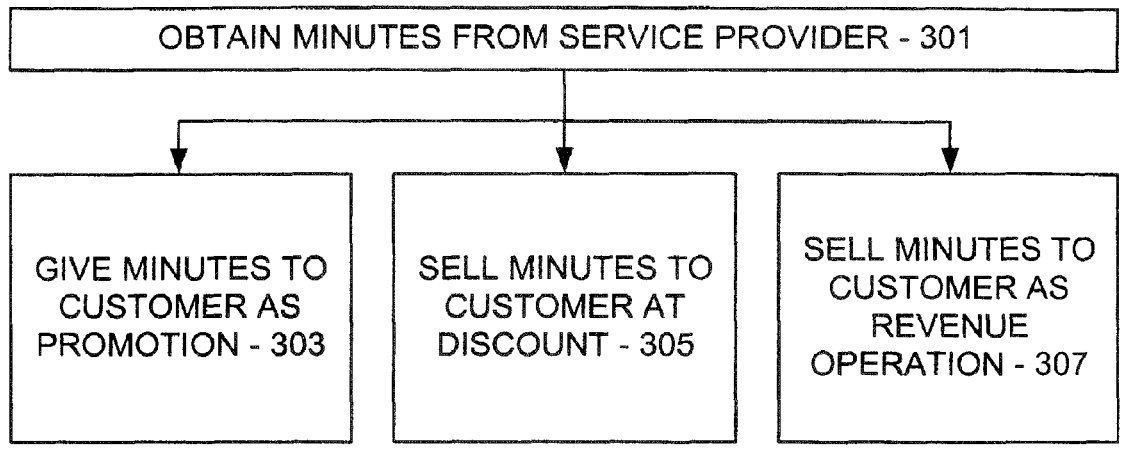
FIG. 3 is a flow chart showing steps performed by a third party in obtaining minutes in accordance with one embodiment of the present invention.

In addition to selling additional minutes to the customer, the service provider may now sell additional minutes to each of one or more third parties for transfer from such from such third party to the customer (step 205). For example, and referring now to FIG. 3, the third party may be a merchant, and the merchant after obtaining the minutes from the service provider (step 301) may give the additional minutes to the customer as part of a promotion (buy a case of motor oil and get thirty free minutes, open a bank account and get a thousand free minutes, get a minute for each dollar spent on a credit card, etc.) (step 303) or may sell the minutes to the customer at a discount as part of a promotion (buy a dress and get 100 minutes for a dollar, try a new food product in a store and get 10 minutes for a cent, e.g.) (step 305). The third party may also sell the minutes to the customer as a revenue generating operation (step 307), which of course requires that the minutes be purchased from the service provider at a discount and/or sold to the customer at a price above the purchase price. In any case, transfers of the minutes between parties requires a secure transferring mechanism to ensure that the minutes are properly transferred and also to ensure that unscrupulous entities do not improperly create and/or transfer minutes. As may be appreciated, the secure transferring mechanism can be entirely electronic or can allow the use of a voucher having written material and/or electronically encoded material thereon (a paper coupon, a magnetic-strip card, a stored value card, etc). Such a secure transferring mechanism is known or should be apparent to the relevant public and therefore need not be described herein in any detail. Any particular secure transferring mechanism may therefore be employed without departing from the spirit and scope of the present invention.

Note that in commoditizing minutes, and again referring to FIG. 2, the service provider may be able to offer cellular telephone service to the customer in the form of a service package having a discounted or even free price, or even a negative price—i.e., where the service provider pays the customer to take the service package. That is, instead of offering packages with provided minutes for a set fee, the service provider may offer packages with a reduced number of provided minutes or even no minutes at the aforementioned discounted or free or negative price. In such a situation, the customer would be responsible for purchasing or otherwise obtaining the minutes from the service provider or from one or more third parties, and the service provider would operate based on a business plan wherein the sale of minutes is the main profit center and the sale of service and service packages is a subsidiary profit center, a break-even function, or even a loss-leader necessary to enhance sales of minutes. Conceivably, the customer could obtain service from the service provider for free and obtain minutes from third parties for free through various of the aforementioned promotions, with the result being that the service costs the customer nothing.

Despite the customer being provided with a number of minutes as part of a package and/or despite obtaining a number of minutes from the service provider or third parties, the customer may still use more minutes in a billing cycle than the number of minutes provided and/or obtained. In such a case, the excess minutes are an underage (step 207). The service provider may choose to charge the customer a premium amount for the underage in an effort to generate profit and also to urge the customer either to select another service package that provides more minutes or to obtain more minutes from third parties (step 209).

As an alternative, though, the service provider may choose to automatically roll over the underage to the next billing cycle to be applied against the provided minutes therefrom (step 211). Of course, the service provider has to make a credit decision if it appears that the underage is severe, if underages are continuously being rolled over by the customer from billing cycle to billing cycle, and/or if the underage is escalating from billing cycle to billing cycle. As another alternative, the service provider may choose to allow the customer to post-purchase minutes to be applied against the underage (step 213). Such post-purchased minutes may be priced at a premium also.

As heretofore discussed, the customer may obtain commoditized minutes for use in connection with a cellular telephone service and service package. As may also be appreciated, the customer may also expend provided and/or obtained commoditized minutes in other regards, for example in connection with purchasing goods and services or even as a gift to a friend or relative.

Figure 4:
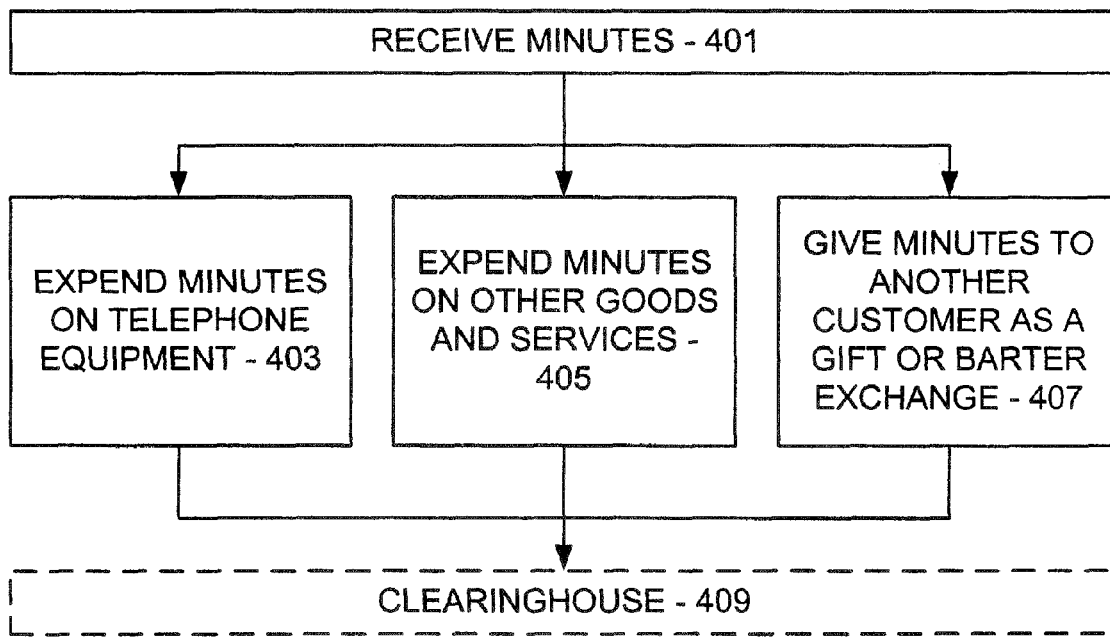
FIG. 4 is a flow chart showing steps performed by a customer in expending minutes in accordance with one embodiment of the present invention.

In particular, and referring now to FIG. 4, after receiving minutes from one source or another (step 401), the customer may expend commoditized minutes to purchase cellular telephone equipment from the cellular telephone provider or elsewhere—a new cellular telephone, a telephone charger, etc. (step 403). Likewise, the customer may expend commoditized minutes to purchase goods and/or services from participating merchants, where the goods and services have nothing at all to do with cellular telephone service—a kitchen appliance, a gym membership, a toy, an automobile, etc. (step 405). Further, the customer may choose to simply give commoditized minutes to another customer, either as a gift or as payment in connection with a barter transaction (step 407). As may be appreciated, and once again, a transfer of commoditized minutes from a customer to such a merchant or other customer requires the aforementioned secure transferring mechanism to ensure that the minutes are properly transferred and also to ensure that unscrupulous entities do not improperly create and/or transfer minutes.

Note that while commoditized minutes may expire upon the customer discontinuing service from the service provider, such commoditized minutes need not necessarily expire when the customer switches from one service package to another from the service provider. In particular, the service provider may roll over the commoditized minutes from the one service package to the other. Moreover, the service provider may even choose to offer additional minutes to the customer as an incentive to switch, if such incentive is deemed desirable. Conversely, the service provider may charge the customer a number of minutes as a disincentive to switch, if such disincentive is deemed desirable.

Note, too, that in the course of transferring minutes to or from the customer, the service provider may perform such transfer, or the transfer may be effectuated by a third party acting in the manner of a transferring organization or clearinghouse (step 409, FIG. 4). Such a clearinghouse is especially useful if the transfer involves different service providers, or if the transferor is transferring to obtain cash or cash equivalent value. In the former, it may for example be the case that a customer is giving minutes to a relative as a gift, and the customer and relative have different service providers. In the latter, a merchant receiving minutes from the customer in exchange for goods or services may wish to take the received minutes and exchange them for cash or credit. In either case, it is expected that the clearinghouse can effectuate the transfer and properly credit and debit all relevant parties as appropriate. Of course, in doing so, the clearinghouse may charge a small fee to the transferor, transferee, or both, and the fee may be collected in cash or cash equivalent value or even in the form of minutes. Clearinghouses and clearing operations are generally known or should be apparent to the relevant public and therefore need not be described herein in any detail. Accordingly, any type of such clearinghouses and clearing operations may be employed without departing from the spirit and scope of the present invention.

As should be understood, the present invention has heretofore been disclosed in terms of a cellular telephone service provider providing cellular telephone service in value increments of minutes. Nevertheless, and importantly, the present invention is also applicable to any other type of goods or service provider providing goods or services in value increments—a landline telephone service provider, a long-distance service provider, a utility service provider, etc. Accordingly, each other type of goods or service provider providing goods or services in value increments may be considered to be within the spirit and scope of the present invention.

Although not necessary, the present invention is likely embodied in the form of computer programming operating on a computer 22 (FIG. 1). Such programming is relatively straightforward and should be apparent to the relevant public, and therefore need not be described herein in any detail. Accordingly, any particular form of programming and programming language may be employed without departing from the spirit and scope of the present invention. Likewise, any particular type or form of computer may be employed, also without departing from the spirit and scope of the present invention.

In the foregoing description, it can be seen that the present invention comprises a new and useful system wherein unused minutes or the like left over at the end of a billing cycle are carried forward to the next billing cycle, and are thus commoditizable. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method, comprising:

processing, by a computer, cellular data service associated with a cellular identifier, the cellular identifier associated with a mobile device using the cellular data service;

querying, by the computer, an electronic database for the cellular identifier, the electronic database having electronic database associations between different allotments of service units and different cellular identifiers including the cellular identifier associated with the cellular data service;

retrieving, by the computer, a monthly allotment of the different allotments of service units from the electronic database, the monthly allotment specifying service units associated with the cellular data service during a billing cycle;

retrieving, from the electronic database, service unit credits transferred from a third party merchant associated with the cellular identifier during the billing cycle;

comparing, by the computer, a number of service units consumed during the billing cycle by the cellular identifier to the monthly allotment of the service units and to the service unit credits transferred;

determining, by the computer, that remaining service unit credits remain in the monthly allotment of the service units after comparison between the number of service units consumed and the monthly allotment of the service units;

rolling over, by the computer, the remaining service unit credits in the monthly allotment of the service units to the cellular data service in a next billing cycle; and commoditizing the remaining service unit credits in the monthly allotment of the service units to permit a transfer to another party, wherein the remaining service unit credits in the monthly allotment of the service units act as payment for goods and services offered by the another party during the next billing cycle.

2. The method according to claim 1, further comprising subtracting the number of service units consumed during the billing cycle from the monthly allotment of the service units.

3. The method according to claim 1, further comprising decrementing used service units from the monthly allotment of the service units.

4. The method according to claim 1, further comprising billing for the monthly allotment of the service units.

5. The method according to claim 1, further comprising determining an overage of the monthly allotment of the service units.

6. The method according to claim 1, further comprising performing a reconciliation.

7. The method according to claim 1, further comprising determining the number of service units consumed during the billing cycle exceeds the monthly allotment of the service units.

8. The method according to claim 1, further comprising retrieving a monthly usage of minutes of service.

9. The method according to claim 1, further comprising determining an underage between the number of service units consumed during the billing cycle and the monthly allotment of the service units.

10. The method according to claim 9, further comprising rolling over the underage to the next billing cycle.

11. A method, comprising:

processing, by a computer, cellular telephone calls associated with a cellular identifier, the cellular identifier being at least one of a calling number and a called number for each one of the cellular telephone calls;

querying, by the computer, an electronic database for the cellular identifier, the electronic database having electronic database associations between different allotments of service units and different cellular identifiers including the cellular identifier associated with the cellular telephone calls;

retrieving, by the computer, an electronic value associated with a monthly allotment of the different allotments of service units from the electronic database, the monthly allotment describing available minutes of the cellular telephone calls during a billing cycle;

calculating, by the computer, the electronic value of a total number of minutes used while processing the cellular telephone calls during the billing cycle;

retrieving, by the computer, the electronic value of service unit credits transferred associated with the cellular identifier during the billing cycle;

comparing, by the computer, the electronic value of the monthly allotment of the available minutes to the electronic value of the total number of minutes used and to the electronic value of the service unit credits transferred;

determining, by the computer, that, at an end of the billing cycle, remaining minutes remain in the monthly allotment of the available minutes;

rolling over, by the computer, the remaining minutes in the monthly allotment of the available minutes to electronic database entries representing a next billing cycle; and sending, from the computer, the electronic value of the remaining minutes in the monthly allotment of the available minutes as an electronic payment to a network address associated with a third party.

12. The method according to claim 11, further comprising determining no minutes remain in the monthly allotment of the available minutes.

13. The method according to claim 11, further comprising billing for the monthly allotment of the available minutes.

* * * * *